(12) United States Patent
Kizu

(10) Patent No.: US 11,218,040 B2
(45) Date of Patent: Jan. 4, 2022

(54) ROTOR AND MOTOR

(71) Applicant: Nidec Corporation, Kyoto (JP)

(72) Inventor: Takahiro Kizu, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 110 days.

(21) Appl. No.: 16/691,669

(22) Filed: Nov. 22, 2019

(65) Prior Publication Data

US 2020/0212739 A1 Jul. 2, 2020

(30) Foreign Application Priority Data

Dec. 28, 2018 (JP) .............................. JP2018-246833

(51) Int. Cl.
*H02K 1/27* (2006.01)
*H02K 1/28* (2006.01)
*B62D 5/04* (2006.01)

(52) U.S. Cl.
CPC .............. *H02K 1/278* (2013.01); *H02K 1/28* (2013.01); *B62D 5/0403* (2013.01)

(58) Field of Classification Search
CPC .......... H02K 1/278; H02K 1/28; H02K 1/146; H02K 3/525; H02K 1/2706; H02K 5/04; B62D 5/0403
See application file for complete search history.

(56) References Cited

U.S. PATENT DOCUMENTS

2010/0327680 A1 12/2010 Miyachi et al.
2019/0315387 A1* 10/2019 Park ........................ H02K 1/28

* cited by examiner

*Primary Examiner* — Thomas Truong
(74) *Attorney, Agent, or Firm* — Keating & Bennett

(57) ABSTRACT

A rotor core that rotates about a central axis includes magnets located radially outside of the rotor core and disposed along a circumferential direction, a holder including a support portion that supports the rotor core and the magnets from a first side in an axial direction, and a rotor cover including a cylindrical portion that surrounds the rotor core, the magnets, and the holder from an outside in a radial direction and that opens toward the first side. The rotor cover includes a bottom portion that supports the rotor core from a second side of the rotor core in the axial direction. A radially outer edge portion of the support portion includes a first portion and a second portion adjacent to the first portion in the circumferential direction.

8 Claims, 6 Drawing Sheets

ROTOR AND MOTOR

CROSS REFERENCE TO RELATED APPLICATION

The present invention claims priority under 35 U.S.C. § 119 to Japanese Application No. 2018-246833 filed on Dec. 28, 2018, the entire contents of which are hereby incorporated herein by reference.

FIELD OF THE INVENTION

The present disclosure relates to a rotor and a motor.

BACKGROUND

A rotor with a rotor cover is known. For example, a motor for electric power steering provided with such a rotor is known.

SUMMARY

An example embodiment of a rotor of the present disclosure includes a rotor core that rotates about a central axis, magnets that are located radially outside of the rotor core and disposed along a circumferential direction, a holder including a support portion that supports the rotor core and the magnet from a first side of the rotor in the axial direction, and a rotor cover including a cylindrical portion that surrounds the rotor core, the magnets, and the holder from radially outside and opens to the first side. The rotor cover includes a bottom portion that supports the rotor core from a second side of the rotor in the axial direction. A radially outer edge portion of the support portion includes a first portion and a second portion adjacent to the first portion in the circumferential direction. An axial end portion of the second portion is positioned toward the first side relative to an axial end portion of the first portion. An axial end portion of the cylindrical portion includes a first bent portion that is bent radially inward and supports the first portion from the first side.

An example embodiment of a motor of the present disclosure includes the above-described rotor.

The above and other elements, features, steps, characteristics and advantages of the present disclosure will become more apparent from the following detailed description of the example embodiments with reference to the attached drawings.

DETAILED DESCRIPTION

The Z-axis direction appropriately shown in each figure is a vertical direction with the positive side as the "upper side" and the negative side as the "lower side". The central axis J appropriately shown in each figure is parallel to the Z-axis direction, and an imaginary line extending in the vertical direction. In the following description, the axial direction of the central axis J, that is, the direction parallel to the vertical direction is simply referred to as "axial direction", the radial direction centered on the central axis J is simply referred to as "radial direction", and the circumferential direction about the central axis J is simply referred to as "circumferential direction".

In the present example embodiment, the upper side corresponds to one side in the axial direction. In the present example embodiment, the lower side corresponds to the other side in the axial direction. Note that the vertical direction, the upper side, and the lower side are names for merely describing the arrangement relationship or the like of respective portions. The actual arrangement relationship or the like may be, for example, an arrangement relationship other than, for example, the arrangement relationship indicated by these names.

Figure 1:
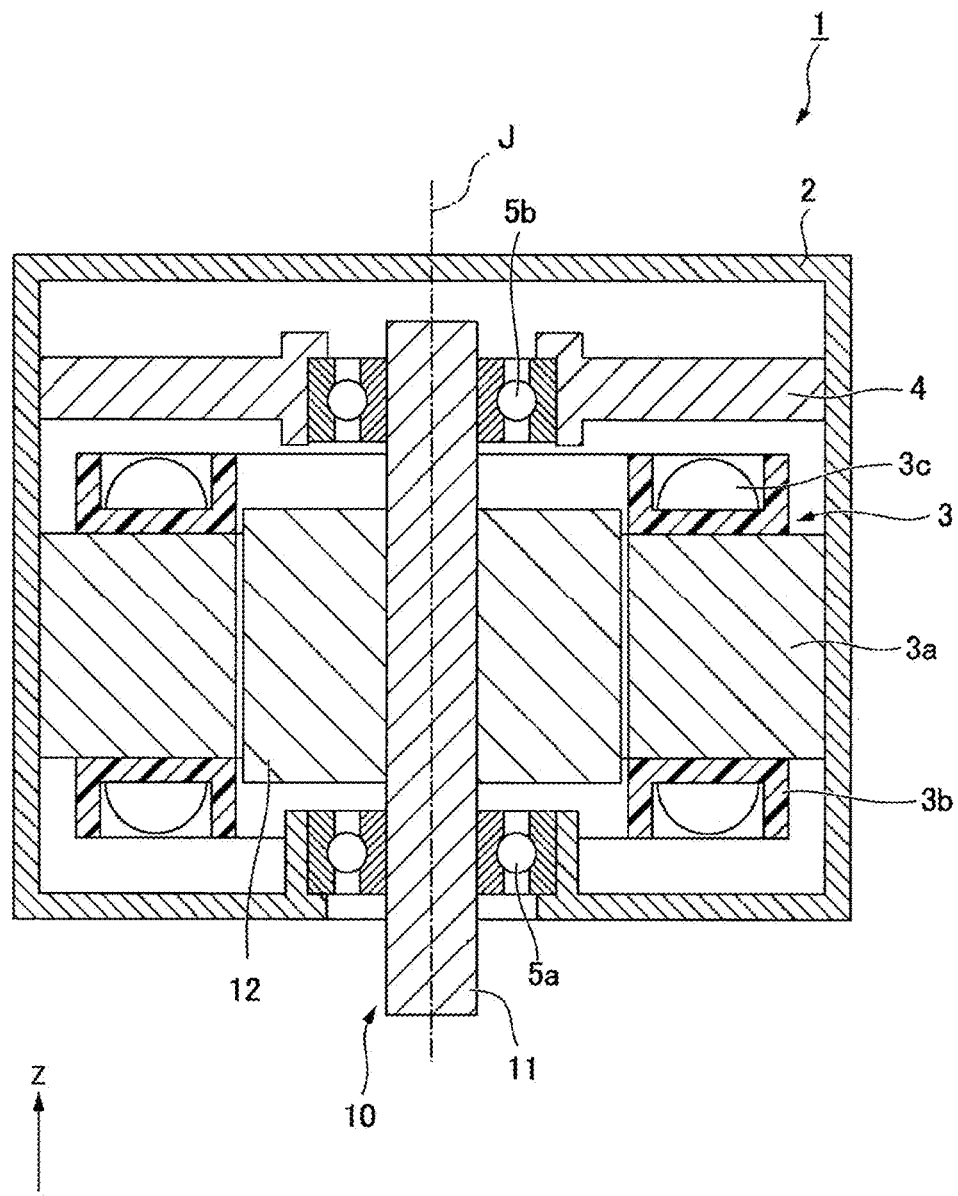
FIG. 1 is a cross-sectional view showing a motor of an example embodiment of the present disclosure.

As shown in FIG. 1, a motor 1 of the present example embodiment includes a housing 2, a rotor 10, a stator 3, a bearing holder 4, and bearings 5a and 5b. The housing 2 accommodates the rotor 10, the stator 3, the bearing holder 4, and the bearings 5a and 5b. The stator 3 is located radially outside of the rotor 10. The stator 3 includes a stator core 3a, an insulator 3b, and a plurality of coils 3c. The plurality of coils 3c is attached to the stator core 3a via the insulator 3b. The bearing holder 4 holds the bearing 5b.

The rotor 10 is rotatable about the central axis J. The rotor 10 includes a shaft 11 and a rotor body 12. The shaft 11 has a cylindrical shape that extends in the axial direction about the central axis J. The shaft 11 is supported by the bearings 5a and 5b so as to be rotatable about the central axis J. The rotor body 12 is fixed to the outer peripheral surface of the shaft 11. As shown in FIG. 2 to FIG. 5, the rotor body 12 includes a rotor core 20, a plurality of magnets 30, a holder 40, and a rotor cover 50. That is, the rotor 10 includes the rotor core 20, the plurality of magnets 30, the holder 40, and the rotor cover 50. In FIG. 3, the illustration of the rotor cover 50 is omitted.

Figure 4:
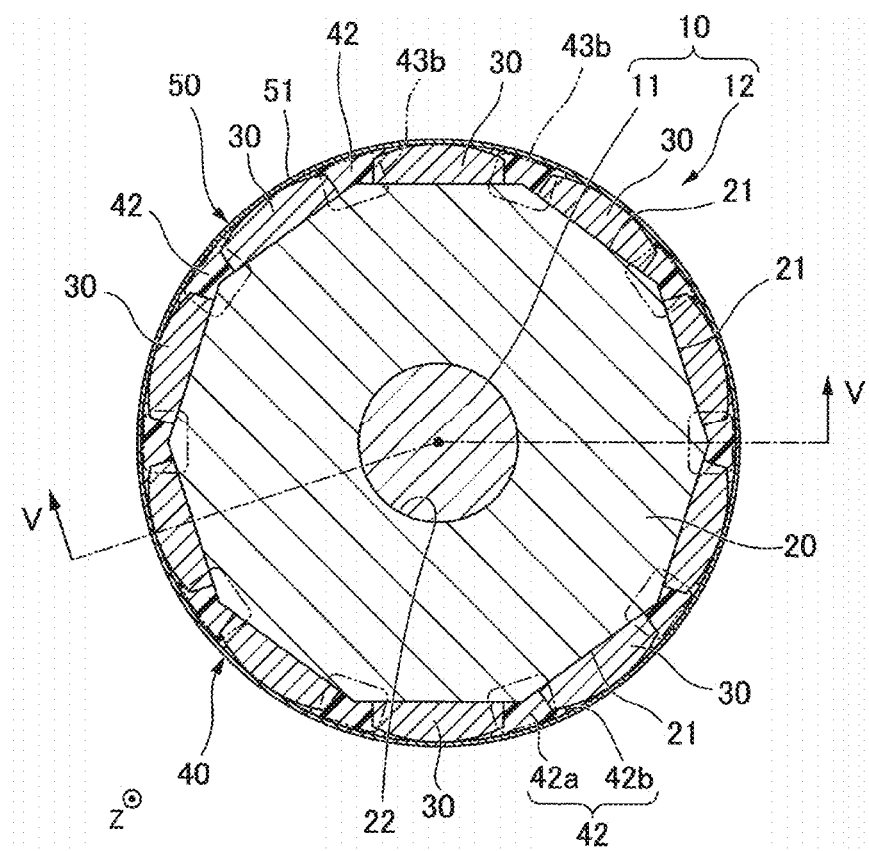
FIG. 4 is a cross-sectional view showing the rotor of the example embodiment taken along line IV-IV in FIG. 2.
Figure 5:
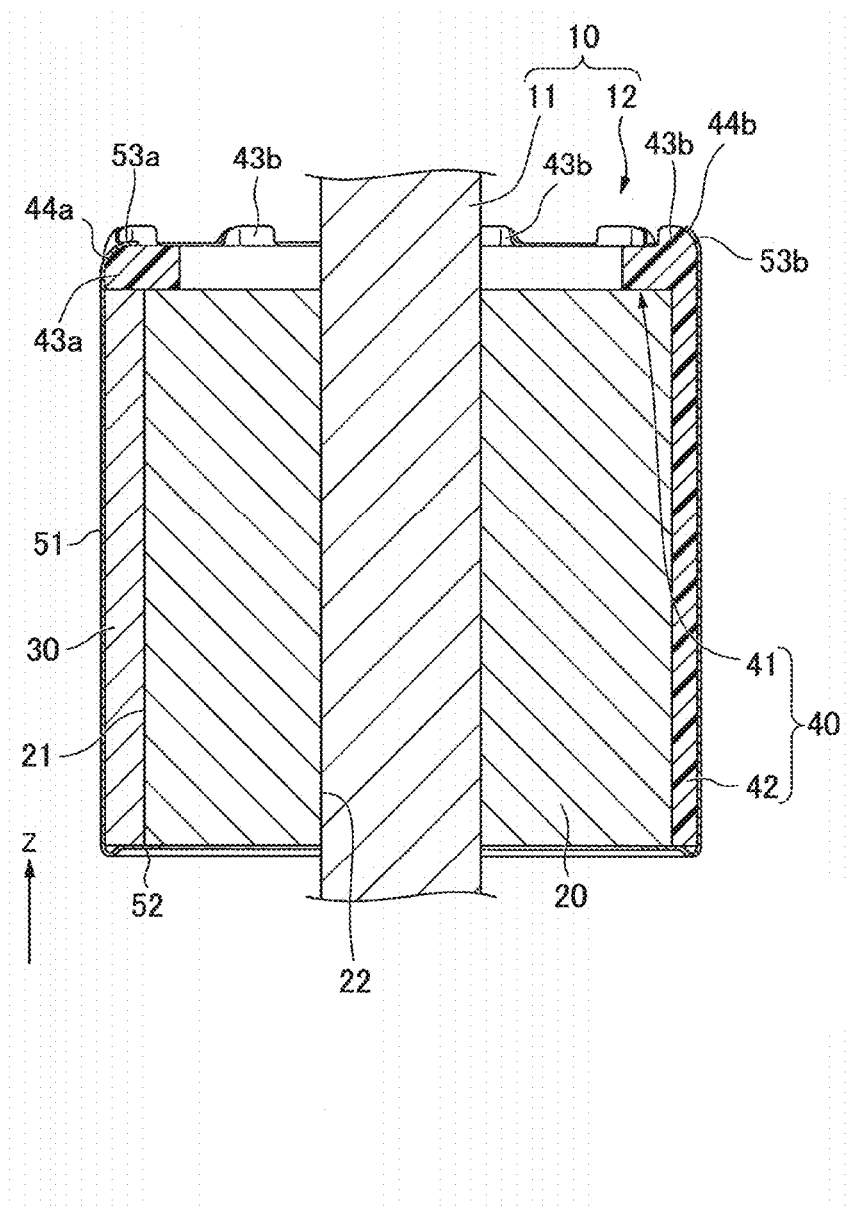
FIG. 5 is a cross-sectional view showing the rotor of the example embodiment taken along line V-V in FIG. 4.

As shown in FIGS. 4 and 5, the rotor core 20 has a columnar shape extending in the axial direction. The rotor core 20 is, for example, a regular decagonal column with the central axis J as the center. As shown in FIG. 4, the rotor core 20 has a plurality of magnet support faces 21. The magnet support face 21 extends in the axial direction. The magnet support face 21 is a flat face orthogonal to the radial direction. The plurality of magnet support faces 21 is disposed at equal intervals over the entire circumference along the circumferential direction. Each of the plurality of magnet support faces 21 is each of a plurality of radially outer faces of the rotor core 20 having a regular decagonal column shape. The rotor core 20 may have a polygonal shape other than a regular decagonal column shape or a cylindrical shape.

The rotor core 20 has a fixed hole portion 22 that penetrates the rotor core 20 in the axial direction. The shape of the fixed hole portion 22 as viewed along the axial direction is a circular shape centered on the central axis J. As shown in FIG. 5, the shaft 11 passes through the fixed hole portion 22. The inner peripheral surface of the fixed hole portion 22 is fixed to the outer peripheral surface of the shaft 11. Thereby, the rotor core 20 is fixed to the shaft 11 and rotates around the central axis J together with the shaft 11. Although illustration is omitted, the rotor core 20 is configured by, for example, a plurality of electromagnetic steel plates laminated in the axial direction. The rotor core 20 may be a single member.

As shown in FIGS. 3 to 5, the magnet 30 has a substantially square column shape that is flat in the radial direction and extends in the axial direction. As shown in FIG. 4, the magnet 30 is located radially outside of the rotor core 20. The plurality of magnets 30 is disposed along the circumferential direction. Magnets 30 adjacent to each other along the circumferential direction are spaced apart from each other along the circumferential direction. In the present example embodiment, the plurality of magnets 30 is disposed at equal intervals over the entire circumference along the circumferential direction.

Each of the plurality of magnets 30 is supported on a corresponding one of the plurality of magnet support faces 21 at the radially inner side. The radially inner face of the magnet 30 is a flat face orthogonal to the radial direction and is in contact with the magnet support face 21. The radially outer face of the magnet 30 is a curved surface that protrudes radially outward. A central portion along the circumferential direction of the radially outer face of the magnet 30 is in contact with an inner peripheral surface of a cylindrical portion 51 of the rotor cover 50 described later. Thereby, the magnet 30 is sandwiched in the radial direction in contact with the rotor core 20 and the rotor cover 50. The radially outer face of the magnet 30 is spaced radially inward from the inner peripheral surface of the cylindrical portion 51 with increasing distance from the circumferential central portion toward both sides in the circumferential direction.

As shown in FIG. 5, the axial dimension of the magnet 30 is the same as the axial dimension of the rotor core 20, for example. For example, the upper face of the magnet 30 and the upper face of the rotor core 20 are disposed on the same plane orthogonal to the axial direction. For example, the lower face of the magnet 30 and the lower face of the rotor core 20 are disposed on the same plane orthogonal to the axial direction. Note that the axial dimension of the magnet 30 and the axial dimension of the rotor core 20 may be different from each other.

The holder 40 holds the rotor core 20 and magnets 30 connected to each other. The holder 40 is formed as a single member by, for example, insert molding in which a resin is poured into a mold in which the rotor core 20 and the magnets 30 are inserted. As shown in FIG. 3, the holder 40 includes a support portion 41 and a plurality of column portions 42. The holder 40 may be formed separately from the rotor core 20 and the magnets 30.

The support portion 41 has an annular shape extending along the circumferential direction. The support portion 41 has, for example, an annular shape centered on the central axis J. The support portion 41 may be polygonal annular. The support portion 41 surrounds the shaft 11. As shown in FIG. 5, the support portion 41 is located above the rotor core 20 and the magnets 30. The lower face of the support portion 41 is in contact with the upper face of the radially outer edge portion of the rotor core 20 and the upper face of the magnets 30. Thereby, the support portion 41 supports the rotor core 20 and the magnets 30 from above.

As shown in FIG. 3, a radially outer edge portion 43 of the support portion 41 includes a first portion 43a and a second portion 43b adjacent to the first portion 43a along the circumferential direction. For example, a plurality of first portions 43a and a plurality of second portions 43b are provided alternately along the circumferential direction. For example, ten first portions 43a and ten second portions 43b are provided. The plurality of first portions 43a is disposed at equal intervals over the entire circumference along the circumferential direction. The plurality of second portions 43b is disposed at equal intervals over the entire circumference along the circumferential direction. The first portion 43a and the second portion 43b that are adjacent to each other along the circumferential direction are connected to each other.

Each first portion 43a is disposed at a position overlapping a corresponding magnet 30 when viewed along the axial direction. As shown in FIG. 4, each second portion 43b is disposed at a position overlapping a space between the magnets 30 adjacent along the circumferential direction when viewed along the axial direction.

As shown in FIG. 3, the upper end portion of the first portion 43a is disposed at the same position in the axial direction as, for example, the upper end portion of the radially inner edge portion of the support portion 41. A first boundary portion 44a that is a boundary between the radially outer face and the upper end face of the first portion 43a is rounded.

The upper end portion of the second portion 43b is located above the upper end portion of the first portion 43a. The upper end portion of the second portion 43b is positioned above the upper end portion of the radially inner edge portion of the support portion 41, for example. A portion, of the second portion 43b, located above the first portion 43a is, for example, a protrusion portion that protrudes upward. That is, in other words, it can be said that the radially outer edge portion 43 of the support portion 41 includes, for example, an annular portion that includes the first portion 43a and surrounds the central axis J, and a protrusion portion protruding upward from the annular portion. Furthermore, in other words, it can be said that the support portion 41 includes an annular main body surrounding the central axis J and a protrusion portion protruding upward from the radially outer edge portion of the main body.

In addition, since the first portion 43a located between the second portions 43b adjacent along the circumferential direction has an upper end portion located below the second portion 43b, in other words, it can be said that the radially outer edge portion 43 of the support portion 41 has a recess portion that is recessed downward in the first portion 43a.

A second boundary portion 44b, which is the boundary between the radially outer face and the upper end face of the second portion 43b, is rounded. The curvature of the second boundary portion 44b is the same as the curvature of the first boundary portion 44a, for example. The radially inner face of the second portion 43b is, for example, a flat face orthogonal to the radial direction. Both side faces of the second portion 43b along the circumferential direction are, for example, flat faces orthogonal to the circumferential direction. A dimension of the second portion 43b along the circumferential direction is smaller than, for example, a dimension of the first portion 43a along the circumferential direction.

The plurality of column portions 42 extends downward from the support portion 41. For example, the plurality of column portions 42 extends downward from the respective second portions 43b of the support portion 41. In other words, the second portion 43b is provided above the column portion 42. The plurality of column portions 42 is disposed at equal intervals over the entire circumference along the circumferential direction. The column portion 42 is positioned between the magnets 30 adjacent to each other along the circumferential direction. The column portion 42 can suppress the movement of the magnet 30 along the circumferential direction with respect to the rotor core 20.

As shown in FIG. 5, the axial dimension of the column portion 42 is the same as the axial dimension of the rotor core 20 and the axial dimension of the magnet 30, for example. The lower end portion of the column portion 42 is disposed at the same position as the lower end portion of the rotor core 20 and the lower end portion of the magnet 30 in the axial direction, for example. Note that the axial dimension of the column portion 42 may be different from the axial dimension of the rotor core 20 and the axial dimension of the magnet 30.

As shown in FIG. 4, both side faces of the column portion 42 along the circumferential direction are in contact with the magnets 30 adjacent along the circumferential direction. Each of the column portions 42 is disposed radially outside of the corner portion of the rotor core 20. The radially inner face of the column portion 42 is in contact with the radially outer face of the corner portion of the rotor core 20. Thereby, the column portion 42 is caught by the corner portion of the rotor core 20 in the circumferential direction and it is possible to suppress rotation of the holder 40 along the circumferential direction with respect to the rotor core 20. The radially outer face of the column portion 42 is in contact with the inner peripheral surface of the cylindrical portion 51 (described later) of the rotor cover 50. The radially outer face of the column portion 42 has a shape along the inner peripheral surface of the cylindrical portion 51.

The column portion 42 has a column portion main body 42a and a projection portion 42b. The projection portion 42b protrudes from the radially outer end portion of the column portion main body 42a toward both sides along the circumferential direction. The projection portion 42b is in contact with the radially outer faces of the magnets 30 that are adjacent to both sides of the column portion 42 along the circumferential direction. Thereby, the projection portion 42b supports the magnet 30 from the radially outside. Therefore, it is possible to suppress movement of the magnet 30 radially outward with respect to the rotor core 20.

Figure 2:
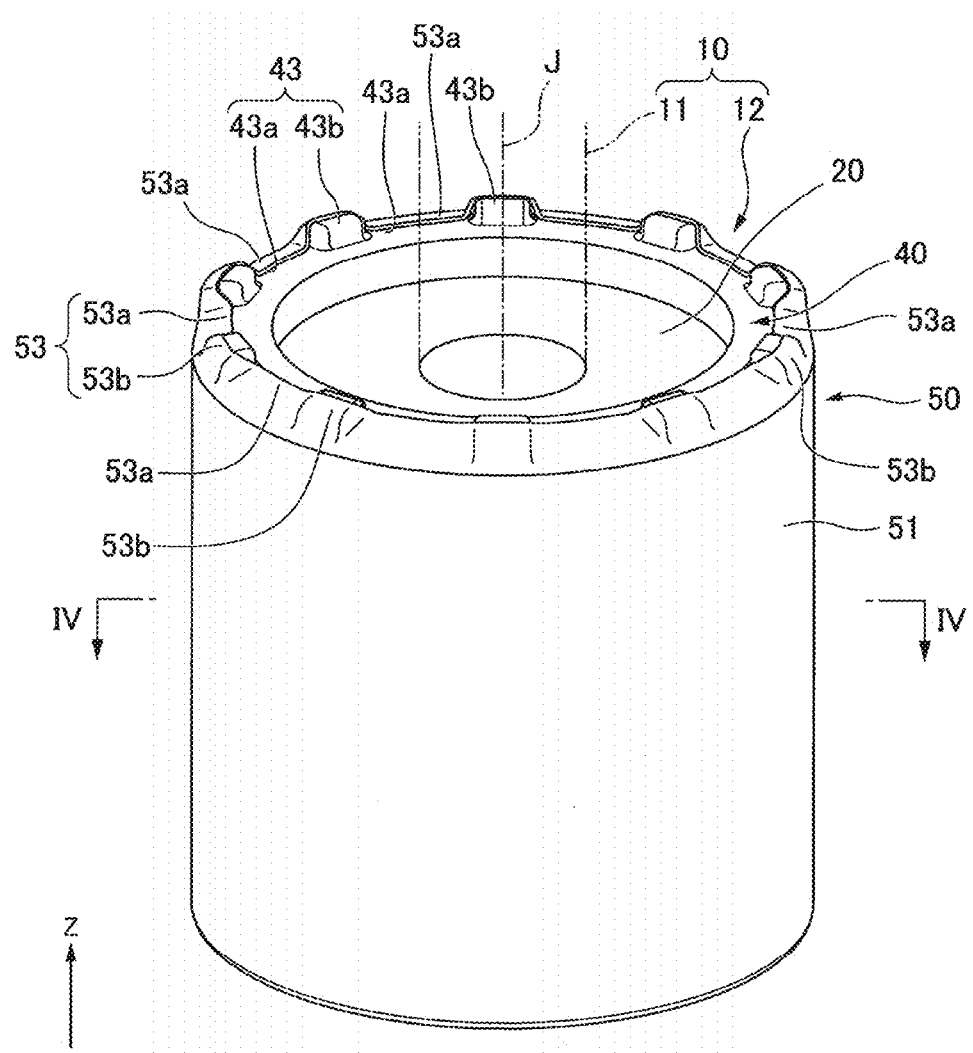
FIG. 2 is a perspective view showing a rotor of an example embodiment of the present disclosure.
Figure 3:
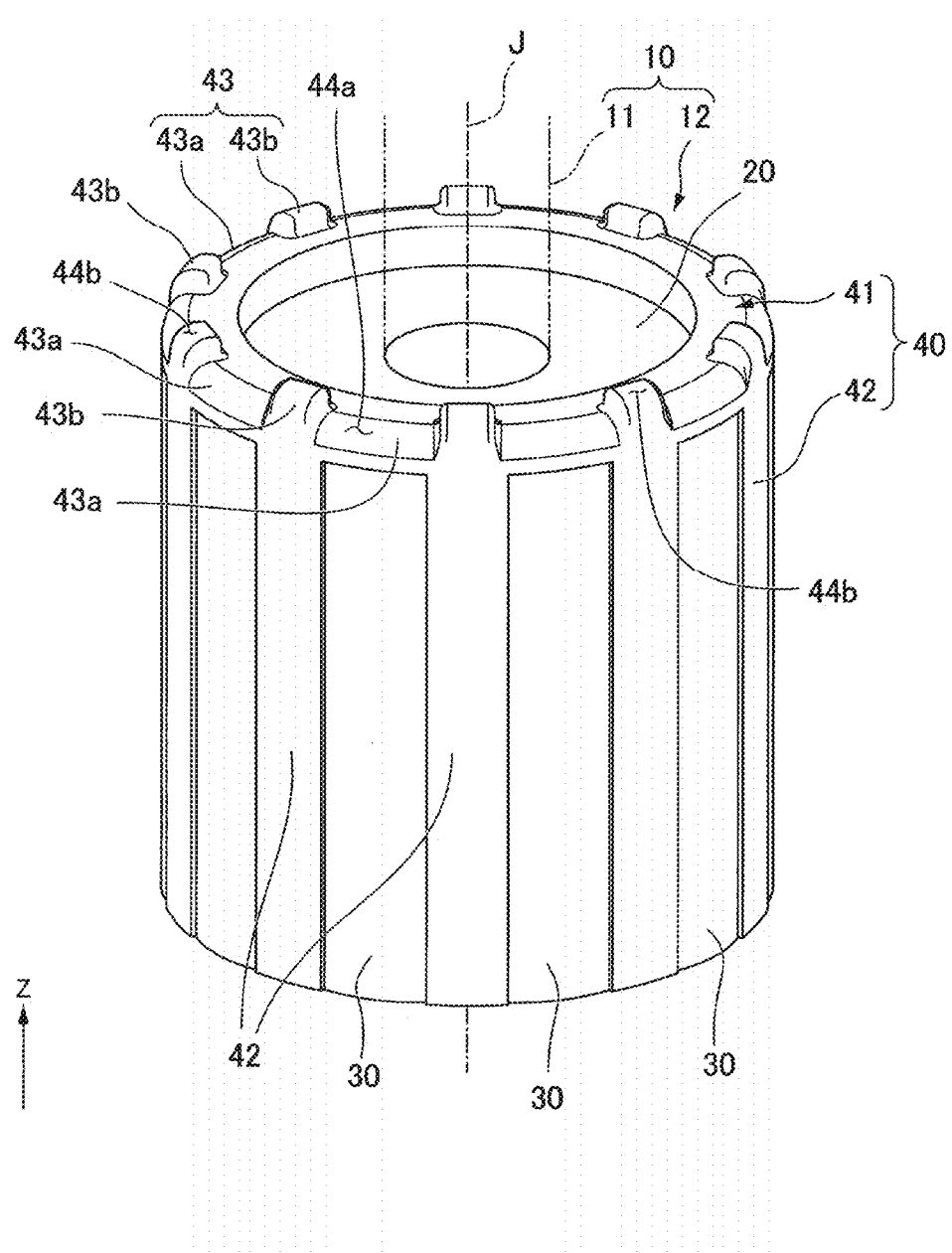
FIG. 3 is a perspective view showing a portion of a rotor of an example embodiment of the present disclosure.

As shown in FIGS. 2 and 5, the rotor cover 50 has a bottom portion 52 and the cylindrical portion 51. As shown in FIG. 5, the bottom portion 52 is located below the rotor core 20. The bottom portion 52 has, for example, an annular shape centered on the central axis J. The bottom portion 52 is plate-shaped with the plate face directed in the axial direction. The upper face of the bottom portion 52 is in contact with the radially outer edge portion of the lower face of the rotor core 20. Thereby, the bottom portion 52 supports the rotor core 20 from below. The bottom portion 52 is in direct contact with the rotor core 20, for example. For this reason, the rotor 10 can be reduced in size in the axial direction as compared with the case where, for example, the bottom portion 52 is in contact with the rotor core 20 indirectly via part of the holder 40. Note that the bottom portion 52 may be polygonal annular or non-annular.

The upper face of the bottom portion 52 is in contact with, for example, the lower face of the magnets 30 and the lower face of the column portions 42. Thereby, the bottom portion 52 supports the magnets 30 and the holder 40 from below.

The cylindrical portion 51 extends upward from the radially outer edge portion of the bottom portion 52. The cylindrical portion 51 is cylindrical around the central axis J. The cylindrical portion 51 opens upward. The cylindrical portion 51 is located radially outside of the magnets 30. The cylindrical portion 51 surrounds the rotor core 20, the magnets 30, and the holder 40 from the outside in the radial direction.

As shown in FIG. 2, at least part of the upper end portion 53 of the cylindrical portion 51 is bent inward in the radial direction. The upper end portion 53 of the cylindrical portion 51 is bent, for example, over the entire circumference. The upper end portion 53 of the cylindrical portion 51 has, for example, a first bent portion 53a and a second bent portion 53b.

The first bent portion 53a is a portion that is bent inward in the radial direction and supports the first portion 43a from above. The first bent portion 53a is in contact with the first portion 43a from above and the radially outside. As shown in FIG. 5, the first bent portion 53a is disposed at a position overlapping the bottom portion 52 when viewed along the axial direction. The first bent portion 53a and the bottom portion 52 sandwich the support portion 41, the rotor core 20, and the magnet 30 in the axial direction. Thereby, it is possible to suppress coming-off of the rotor cover 50 in the axial direction.

As shown in FIG. 2, the first bent portion 53a is provided for each first portion 43a, for example. For example, a plurality of first bent portions 53a is provided at equal intervals over the entire circumference along the circumferential direction. The first bent portion 53a is located between the second portions 43b adjacent along the circumferential direction. The both side end portions of the first bent portion 53a along the circumferential direction are in contact with portions protruding above the first portion 43a in the second portions 43b adjacent on both sides along the circumferential direction. The first bent portion 53a is hooked in the circumferential direction onto both of the second portions 43b located on both sides along the circumferential direction. That is, the first bent portions 53a are hooked on the second portion 43b from the both sides along the circumferential direction. For this reason, it is possible to suppress the relative rotation of the rotor cover 50 relative to the rotor core 20, the magnets 30, and the holder 40.

As shown in FIG. 5, the first bent portion 53a is bent, for example, along the first boundary portion 44a. The first bent portion 53a is curved radially inward as it goes upward. The radially inner face of the first bent portion 53a has a shape along the first boundary portion 44a. The radially inner face of the first bent portion 53a is in contact with the first boundary portion 44a. The upper end portion of the first bent portion 53a is also the radially inner end portion of the first bent portion 53a. For example, the first bent portion 53a overlaps the magnet 30 when viewed along the axial direction.

The second bent portion 53b is a portion that is bent inward in the radial direction and is in contact with the second portion 43b. The second bent portion 53b is in contact with the second portion 43b from above and the radially outside. As shown in FIG. 2, the second bent portion 53b is provided, for example, for each second portion 43b. In other words, for example, a plurality of the second bent portions 53b is provided at equal intervals over the entire circumference along the circumferential direction. The both side end portions of the second bent portion 53b along the circumferential direction are connected to the first bent portions 53a adjacent along the circumferential direction.

For example, the second bent portion 53b is bent radially inward along the second boundary portion 44b. The second bent portion 53b is curved radially inward as it goes upward. The radially inner face of the second bent portion 53b has a shape along the second boundary portion 44b. The radially inner face of the second bent portion 53b is in contact with the second boundary portion 44b. The upper end portion of the second bent portion 53b is also the radially inner end portion of the second bent portion 53b, and is located radially outside of the upper end portion of the first bent portion 53a. For example, the second bent portion 53b overlaps the column portion 42 as viewed along the axial direction.

Figure 6:
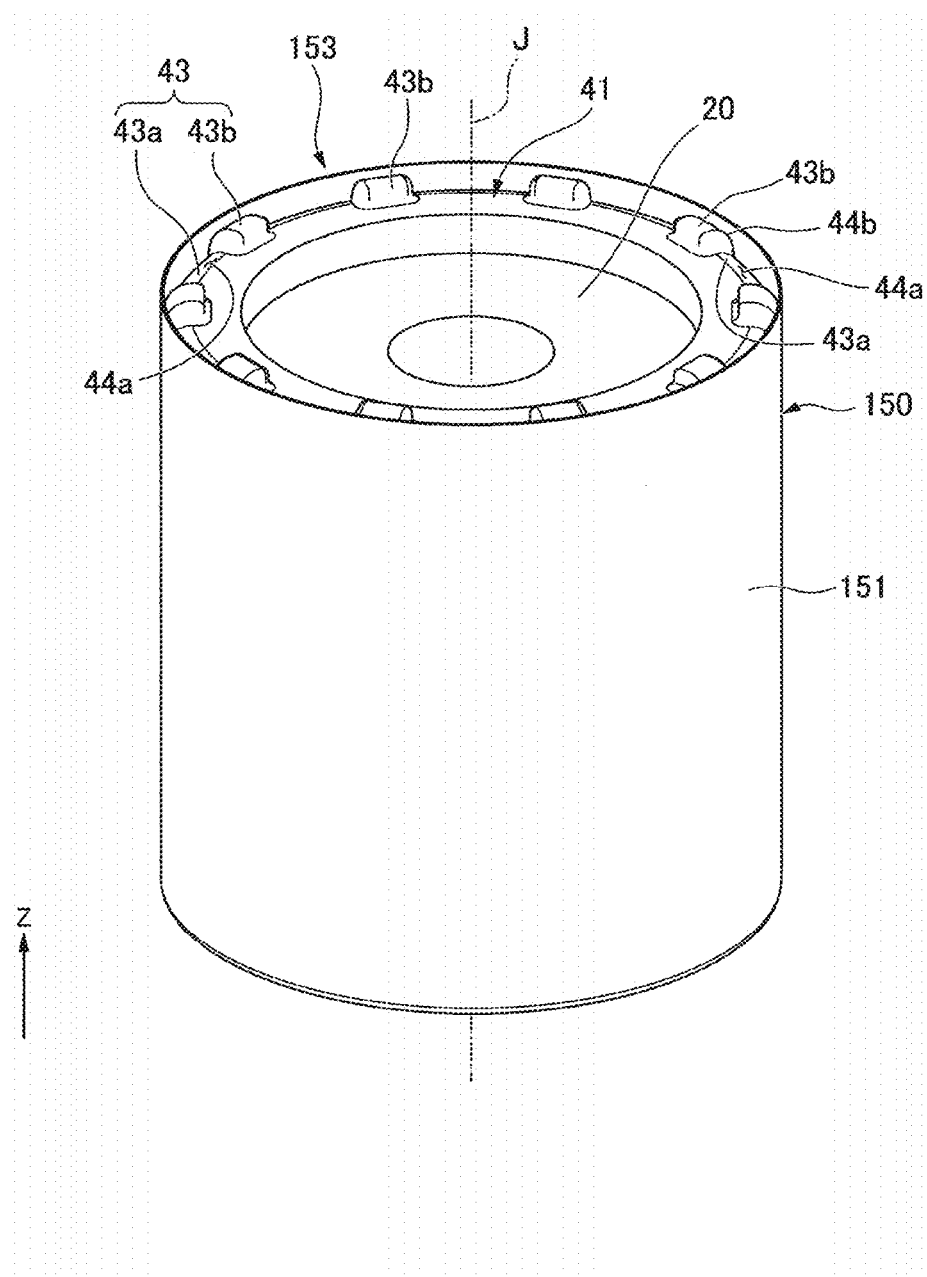
FIG. 6 is a perspective view showing a state in the middle of manufacturing a rotor of an example embodiment of the present disclosure.

The first bent portion 53a and the second bent portion 53b described above are formed by bending radially inward the upper end portion 153 of a cylindrical portion 151 of a rotor cover 150 shown in FIG. 6 using, for example, a mold or the like. The rotor cover 150 is a rotor cover in a state before the first bent portion 53a and the second bent portion 53b are made. The cylindrical portion 151 is a cylindrical portion in a state before the first bent portion 53a and the second bent portion 53b are made.

As shown in FIG. 6, an operator or the like attaches the rotor cover 150 to an assembly in which the rotor core 20, the magnets 30 and the holder 40 are combined. The operator or the like bends radially inward a portion, of the upper end portion 153 of the cylindrical portion 151, located radially outside of each first portion 43a by approaching the mold from above. The mold includes a plurality of bending process portions having a shape along the first boundary portion 44a along the circumferential direction. For this reason, by pressing part of the end portion 153 against the first boundary portion 44a by each bending process portion, part of the end portion 153 can be easily bent along the first boundary portion 44a. Thereby, the plurality of first bent portions 53a can be formed.

Also, when the first bent portion 53a is made, the portion, of the end portion 153, located between the portions that are the first bent portion 53a is bent radially inward as the portions on both sides along the circumferential direction are bent radially inward. The portion, of the end portion 153, located between the portions that are the first bent portion 53a is a portion located radially outside of the second portion 43b, and is a portion that is the second bent portion 53b. The portion, of the end portion 153, that is the second bent portion 53b comes into contact with the second boundary portion 44b by being bent radially inward, and is bent along the second boundary portion 44b.

In this way, an operator or the like can also make the second bent portion 53b at the same time by making the plurality of first bent portions 53a.

In this way, the operator or the like can make the plurality of first bent portions 53a and the plurality of second bent portions 53b simultaneously by bending radially inward part of the end portion 153 of the cylindrical portion 151 using the mold described above.

In this specification, the "operator or the like" includes an operator who performs each operation, an assembling apparatus, and the like. Each operation may be performed only by the operator, may be performed only by the assembling apparatus, or may be performed by the operator and the assembling apparatus.

According to this example embodiment, the upper end portion 53 of the cylindrical portion 51 has the first bent portion 53a that supports the first portion 43a provided on the support portion 41 from above, and the rotor cover 50 has the bottom portion 52 that supports the rotor core 20 from below. For this reason, the rotor core 20 and the holder 40 can be sandwiched in the axial direction by the first bent portion 53a and the bottom portion 52, and it is possible to suppress coming-off of the rotor cover 50 in the axial direction.

Further, the support portion 41 has the second portion 43b adjacent to the first portion 43a along the circumferential direction, and the upper end portion of the second portion 43b is located above the upper end portion of the first portion 43a. For this reason, the first bent portion 53a that supports the first portion 43a from above can be hooked on the second portion 43b along the circumferential direction. Thereby, it is possible to suppress the relative rotation of the rotor cover 50 along the circumferential direction.

Further, the first portion 43a supported by the first bent portion 53a is provided on the radially outer edge portion 43 of the support portion 41. For this reason, compared to the case where the bent portion is brought into contact with the portion closer to the radially inner side of the support portion 41 from above, the length of bending the end portion 153 of the cylindrical portion 151 shown in FIG. 6 can be shortened when making the first bent portion 53a. Thereby, the end portion 153 can be easily bent radially inward, and the first bent portion 53a can be easily formed. Therefore, as mentioned above, the first bent portion 53a that supports the first portion 43a from above can be easily made only by bending part of the end portion 153 radially inward once.

In this way, according to this example embodiment, the first bent portion 53a made by a single bending process makes it possible to provide the rotor cover 50 with both axial coming-off stop and rotation stop. Therefore, it is possible to easily perform the operation for providing the axial coming-off stop and the operation for providing the rotation stop at a time in one process. Therefore, the number of processes for manufacturing the rotor 10 can be reduced.

In addition, according to the present example embodiment, the upper end portion 53 of the rotor cover 50 has both functions of the axial coming-off stop and the rotation stop. For this reason, after attaching the rotor cover 150 before bending to the assembly in which the rotor core 20, the magnets 30 and the holder are combined, the rotor cover 50 can be fixed without any additional process such as press working or the like on the bottom portion 52. Thereby, the operation of fixing the rotor cover 50 can be easily performed. Further, for example, there is no need to provide, between the bottom portion 52 and the rotor core 20, an interposition portion that hooks, for the rotation stop, part of the bottom portion 52 that is plastically deformed. Therefore, the bottom portion 52 can be brought into direct contact with the rotor core 20, and the axial dimension of the rotor 10 can be easily reduced.

Further, for example, a case is studied where the upper end portion of the cylindrical portion is bent radially inward and the support portion of the holder is supported from above, and then part of the bent portion is plastically deformed to provide the rotation stop. In this case, the other portion of the bent portion may be pushed radially outward by the plastically deformed portion. For this reason, when the operation for providing the axial coming-off stop and the operation for providing the rotation stop with respect to the rotor cover are performed separately in two processes, in some cases, the cylindrical portion swells in the radial direction, and the rotor increases in size in the radial direction.

On the other hand, according to this example embodiment, since the operation for providing the axial coming-off stop and the operation for providing the rotation stop with respect to the rotor cover can be performed in one process, it is possible to suppress the swelling of the cylindrical portion 51 in the radial direction. Thereby, it is possible to suppress an increase in size of the rotor 10 in the radial direction.

Moreover, according to this example embodiment, a plurality of first portions 43a and a plurality of second portions 43b are provided alternately along the circumferential direction, and the first bent portion 53a is provided for each first portion 43a. For this reason, the first bent portion 53a can be hooked on both sides of the second portion 43b along the circumferential direction, and it is possible to more suitably suppress the relative rotation of the rotor cover 50. In addition, since a plurality of first bent portions 53a is provided, it is possible to more suitably suppress the coming-off of the rotor cover 50 in the axial direction.

Further, according to the present example embodiment, the first portions 43a are disposed at equal intervals along the circumferential direction. For this reason, the first bent portion 53a can support the first portion 43a in a balanced manner along the circumferential direction.

Further, according to the present example embodiment, the second portion 43b is provided above the column portion 42. For this reason, for example, when making the holder 40 by resin molding, the resin can be suitably poured into the portion, of the inside of the mold, where the column portion 42 and the second portion 43b are to be formed by providing a gate for pouring the resin above the portion where the column portion 42 is to be formed. Thereby, it is easy to make the second portion 43b.

In addition, according to the present example embodiment, the first boundary portion 44a is rounded, and the first bent portion 53a is bent along the first boundary portion 44a. For this reason, the first bent portion 53a can be preferably placed along the first boundary portion 44a, compared to the case where the first boundary portion 44a has a sharp corner. Thereby, it is possible to suppress the swelling of the first bent portion 53a away from the first boundary portion 44a radially outward. Therefore, it is possible to further suppress an increase in size of the rotor 10 in the radial direction.

According to the present example embodiment, the second boundary portion 44b is rounded, and the second bent portion 53b is bent along the second boundary portion 44b. For this reason, the second bent portion 53b can be easily placed along the second boundary portion 44b, compared to the case where the second boundary portion 44b has a sharp corner. Thereby, it is possible to suppress the swelling of the second bent portion 53b away from the second boundary portion 44b radially outward. Therefore, it is possible to further suppress an increase in size of the rotor 10 in the radial direction.

The present disclosure is not limited to the above-described example embodiments, and the following configurations can be employed. As long as the upper end portion of the second portion is located above the upper end portion of the first portion, the first portion and the second portion provided on the radially outer edge portion of the support portion has no particular limitation. The upper end portion of the second portion may be disposed at the same position in the axial direction as the upper end portion of the radially inner edge portion of the support portion. In this case, the upper end portion of the first portion is positioned below the upper end portion of the radially inner edge portion of the support portion. In this case, in other words, the first portion is a recess portion recessed downward, and the support portion has a recess portion recessed downward at the radially outer edge portion.

The first portions may be disposed at unequal intervals along the circumferential direction. The second portions may be disposed at unequal intervals along the circumferential direction. The number of first portions and the number of second portions are not particularly limited. The number of the first portion and the number of the second portion may be one each. The shape of the first portion and the shape of the second portion are not particularly limited. The circumferential dimension of the second portion may be larger than the circumferential dimension of the first portion, or may be the same as the circumferential dimension of the first portion. The curvature of the first boundary portion of the first portion and the curvature of the second boundary portion of the second portion may be different from each other. The first boundary portion of the first portion may have a shape other than a rounded shape but may have a sharp corner. The second boundary portion of the second portion may have a shape other than a rounded shape but may have a sharp corner. In the above-described example embodiment, the radially inner face of the second portion 43b and both side faces of the second portion 43b along the circumferential direction may be curved surfaces. The first portion may be disposed at a position overlapping a space between the magnets adjacent along the circumferential direction when viewed along the axial direction. In this case, the second portion may be disposed at a position overlapping the magnet in the axial direction when viewed along the axial direction. In this case, the column portion may extend downward from the first portion. The support portion is not particularly limited as long as it supports the rotor core and the magnets from above. The support portion may have a shape other than an annular shape. The holder may be made of a material other than resin.

The upper end portion of the cylindrical portion is not particularly limited as long as the first bent portion is provided. The upper end portion of the cylindrical portion may have a portion in the circumferential direction bent radially inward and may have a portion which is not bent radially inward. A plurality of the first bent portions may be disposed at unequal intervals along the circumferential direction. The first bent portion may be not along the first boundary portion. A plurality of second bent portions may be disposed at unequal intervals along the circumferential direction. The second bent portion may be not along the second boundary portion. The upper end portion of the cylindrical portion may have no second bent portion. The method of bending each bent portion is not particularly limited. An interposition portion may be provided between the bottom portion and the rotor core. In this case, the bottom portion is in contact indirectly with the rotor core via the interposition portion.

The shape of the magnet is not particularly limited. The radially outer face of the magnet may have the same curvature as the curvature of the inner peripheral surface of the cylindrical portion, and may be along the inner peripheral surface of the cylindrical portion. In this case, the entire radially outer face of the magnet may be in contact with the inner peripheral surface of the cylindrical portion.

In addition, the application of the motor of the example embodiments described above is not specifically limited. The motor of the above-described example embodiments may be mounted on a vehicle, for example. Moreover, respective structures mentioned above can be combined suitably in the range in which they do not contradict each other.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:
1. A rotor comprising:
a rotor core rotatable about a central axis;
a plurality of magnets radially outside of the rotor core and along a circumferential direction;

a holder including a support portion that supports the rotor core and the magnets from a first side of the rotor in an axial direction; and a rotor cover including a cylindrical portion that surrounds the rotor core, the magnets, and the holder from an outside in a radial direction and that opens toward the first side; wherein the rotor cover includes a bottom portion that supports the rotor core from a second side of the rotor in the axial direction;

a radially outer edge portion of the support portion includes:
  first portions; and
  second portions adjacent to the first portions in the circumferential direction;

axial end portions of the second portions are positioned toward the first side relative to axial end portions of the first portions;

an axial end portion of the cylindrical portion includes first bent portions that are bent radially inward and support the first portions from the first side; and the first bent portions are hooked onto two opposing sides of the second portions in the circumferential direction.

2. The rotor according to claim 1, wherein
ones of the first portions and the second portions are provided alternately along the circumferential direction; and
the first bent portions are provided for each of the first portions.

3. The rotor according to claim 2, wherein
the support portions are annular along the circumferential direction; and
the first portions are provided at equal or substantially equal intervals along the circumferential direction.

4. The rotor according to claim 2, wherein
the holder includes a plurality of column portions extending from the support portions toward the second side; wherein
the column portion is located between the magnets adjacent along the circumferential direction; and
the second portions are provided on a side of the column portion adjacent to the first side.

5. The rotor according to claim 1, wherein
a first boundary portion which is a boundary between radially outer surfaces and end surfaces of the first portions on the first side is round; and
the first bent portions are bent along the first boundary portion.

6. The rotor according to claim 1, wherein
a second boundary portion which is a boundary between a radially outer surface and an axial end surface of the second portions is round; and
the axial end portion of the cylindrical portion includes a second bent portion bent radially inward along the second boundary portion.

7. The rotor according to claim 1, wherein the bottom portion is in direct contact with the rotor core.

8. A motor comprising the rotor according to claim 1.

* * * * *